(12) United States Patent
Minoiu-Enache

(10) Patent No.: US 9,399,472 B2
(45) Date of Patent: Jul. 26, 2016

(54) AUTONOMOUS MODE VEHICLE CONTROL SYSTEM AND VEHICLE COMPRISING SUCH A CONTROL SYSTEM

(71) Applicant: RENAULT s.a.s., Boulogne-Billancourt (FR)

(72) Inventor: Nicoleta Minoiu-Enache, Versailles (FR)

(73) Assignee: RENAULT s.a.s., Boulogne-Billancourt (FR)

( * ) Notice: Subject to any disclaimer, the term of this patent is extended or adjusted under 35 U.S.C. 154(b) by 0 days.

(21) Appl. No.: 14/390,141

(22) PCT Filed: Apr. 4, 2013

(86) PCT No.: PCT/FR2013/050739
§ 371 (c)(1),
(2) Date: Jan. 26, 2015

(87) PCT Pub. No.: WO2013/150244
PCT Pub. Date: Oct. 10, 2013

(65) Prior Publication Data
US 2015/0134178 A1 May 14, 2015

(30) Foreign Application Priority Data
Apr. 5, 2012 (FR) ..................................... 12 53128

(51) Int. Cl.
*G01C 22/00* (2006.01)
*B60W 50/02* (2012.01)
*B60W 50/035* (2012.01)
(Continued)

(52) U.S. Cl.
CPC .............. *B60W 50/02* (2013.01); *B60W 30/00* (2013.01); *B60W 50/035* (2013.01); *G05D 1/0061* (2013.01); *G05D 2201/0213* (2013.01)

(58) Field of Classification Search
None
See application file for complete search history.

(56) References Cited

U.S. PATENT DOCUMENTS 5,469,356 A  11/1995 Hawkins et al.
6,038,500 A * 3/2000 Weiss ............................. 701/22
(Continued)

FOREIGN PATENT DOCUMENTS

| DE | 103 57 922 | 7/2004 |
|----|-----------|--------|
| EP | 1 143 314 | 10/2001 |
| FR | 2 927 596 | 8/2009 |

OTHER PUBLICATIONS

International Search Report Issued Jun. 11, 2013 in PCT/FR13/050739 Filed Apr. 4, 2013.
(Continued)

*Primary Examiner* — Adam Alharbi
(74) *Attorney, Agent, or Firm* — Oblon, McClelland, Maier & Neustadt, L.L.P.

(57) ABSTRACT

A vehicle control system including human-control members generating signals for manual piloting of actuators of the vehicle, an automatic control module generating signals for automatic piloting of the actuators of the vehicle, and a switching module to select the manual-piloting signals in a manual mode of operation and the autonomous-piloting signals in an autonomous mode of operation. The automatic control module includes a block for automatic formulation of at least one calculated autonomous piloting signal and a security block to transmit to the switching module a calculated autonomous piloting signal in a case of normal autonomous operation and an emergency autonomous piloting signal in a case of abnormal autonomous operation.

8 Claims, 4 Drawing Sheets

Figure 1:
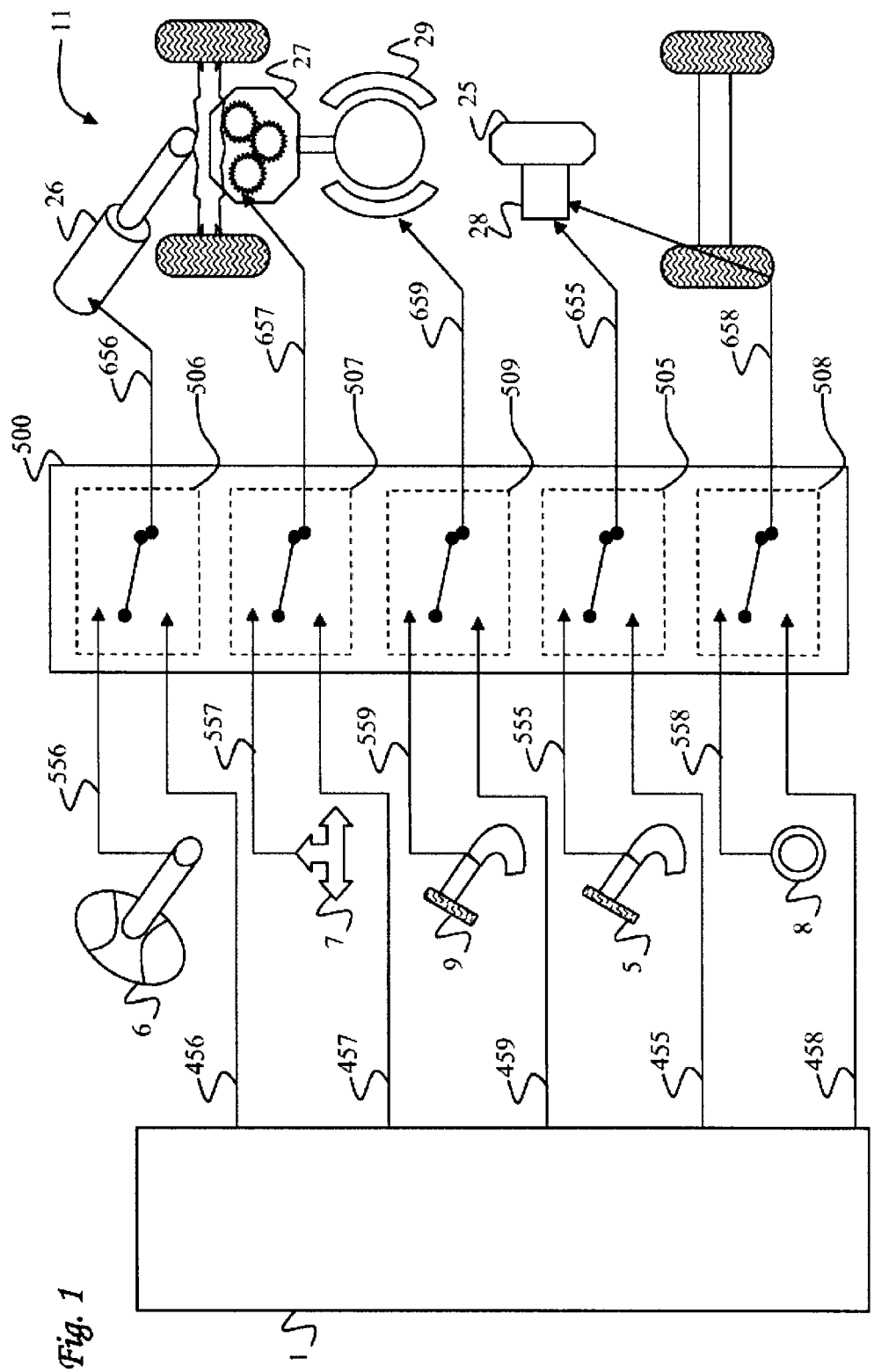

(51) Int. Cl.
*G05D 1/00* (2006.01)
*B60W 30/00* (2006.01)

(56) References Cited

U.S. PATENT DOCUMENTS 8,078,349 B1 12/2011 Prada Gomez et al.
8,321,067 B1 11/2012 Prada Gomez et al.
2001/0027537 A1 10/2001 Nada et al.
2007/0243505 A1* 10/2007 Rath et al. ........................ 434/29
2014/0022070 A1* 1/2014 Golomb ........................ 340/475
2014/0350818 A1* 11/2014 Obermuller ..................... 701/74

OTHER PUBLICATIONS

French Search Report Issued Nov. 28, 2012 in French Patent Application No. 1253128 Filed Apr. 5, 2012.

* cited by examiner

AUTONOMOUS MODE VEHICLE CONTROL SYSTEM AND VEHICLE COMPRISING SUCH A CONTROL SYSTEM

The invention relates to a system for controlling a vehicle in autonomous mode and to a vehicle comprising such a control system.

The invention notably applies to a production vehicle usually intended to operate conventionally in manual mode, or in other words that can be driven by a human being. The invention makes it possible to build vehicles on a production line with a second mode of operation referred to as autonomous mode, in which the vehicle, like a robot, is able to move around without a human driver. These two modes of operation allow numerous services to be carried out, such as for example an automated parking service, a valet service, a service of automatically recharging the battery in the case of an electrically powered vehicle, or even the service of refilling with fuel in the case of a combustion powered vehicle, where possible, a driverless service of driving persons of reduced mobility around, and a service of rebalancing fleets of hire vehicles by returning them to the pool.

Nowadays there are a great many technical prerequisites to bringing into service autonomous vehicles with a high level of automation or dual-mode vehicles, namely having autonomous and manual modes. However, marketing such vehicles or bringing them into public use remains difficult, notably because of the reliability and price considerations.

Knowledge from the prior art includes document U.S. Pat. No. 5,469,356 which discloses a system for automatically controlling, on the one hand, autonomous vehicle operation in response to a speed setpoint and a steering angle coming from a driver, and, on the other hand, manual operation. The control system receives the information item for alternating between automatic mode and manual mode from a button situated in the cabin and a button situated outside the driving cabin of the vehicle.

Document U.S. Pat. No. 8,078,349 discloses an autonomous vehicle comprising a control module for placing the vehicle in autonomous mode by performing an instruction to switch to autonomous mode which is based on a reference data item associated with a detector of a frame of reference in which the vehicle is situated.

None of these two known documents makes provision for the behavior that is to be adopted in the event of an unforeseen situation. This failure to take an unforeseen situation into consideration presents a safety problem and a reliability problem when the vehicle is in autonomous-running mode.

It is an object of the invention to address the problems presented by the prior art, notably in terms of safety in the event of an unforeseen situation.

To this end, one subject of the invention is a vehicle control system comprising:
human-control members generating manual-driving signals for manually driving actuators of the vehicle;
an automatic-control module generating autonomous-driving signals for autonomously driving the actuators of the vehicle;
a switching module designed to select the manual-driving signals in a manual mode of operation and the autonomous-driving signals in an autonomous mode of operation.

The control system is notable in that the automatic-control module comprises:
an automatic-formulation unit that automatically formulates at least one calculated autonomous-driving signal;
a safety unit designed to transmit to the switching module at least the calculated autonomous-driving signal in the case of normal autonomous operation and an emergency autonomous-driving signal in the case of abnormal autonomous operation.

Advantageously, the automatic-control module comprises a supervision unit which houses an overall finite state machine comprising a first overall state associated with the manual mode of operation and a second overall state associated with the autonomous mode of operation so as to send the switching module at least one signal for selecting manual-driving and autonomous-driving signals.

In particular, the overall finite state machine comprises a third overall state associated with the case of abnormal autonomous operation so as to send the safety unit at least one emergency braking signal.

Particularly also, the automatic-control module comprises a diagnostics unit designed to detect any event associated with a case of abnormal autonomous operation and to send the supervision unit at least one signal indicative of the cases of normal and abnormal autonomous operation.

Very advantageously, the automatic-formulation unit comprises a command/control subunit which houses a local finite state machine comprising a first local state associated with an autonomous start and a second local state associated with an autonomous immobilization.

For preference, the control system comprises a navigation and/or location module designed to send the automatic-formulation unit, in real time, course coordinates which are expressed in a frame of reference local to the vehicle.

Another subject of the invention is a method for controlling a vehicle comprising:
one or more manual-mode steps in which human-control members generate manual-driving signals for manually driving actuators of the vehicle;
one or more autonomous-mode steps in which autonomous-driving signals are generated and switched toward said actuators of the vehicle in place of the manual-driving signals.

The method is notable in that the autonomous-mode steps comprise:
a normal autonomous-mode step performed in the case of normal autonomous operation and in which the autonomous-driving signals comprise at least one calculated autonomous-driving signal;
an emergency autonomous-mode step performed in the case of abnormal autonomous operation and in which the autonomous-driving signals comprise at least one emergency autonomous-driving signal.

Advantageously, the control method comprises:
at least one first step for performing an autonomous start;
at least one second step for performing an autonomous immobilization.

A further subject of the invention is a computer program product which comprises instructions for implementing the method according to the invention when they are performed by a computer.

A final subject of the invention is a motor vehicle which comprises a control system according to the invention.

Figure 2:
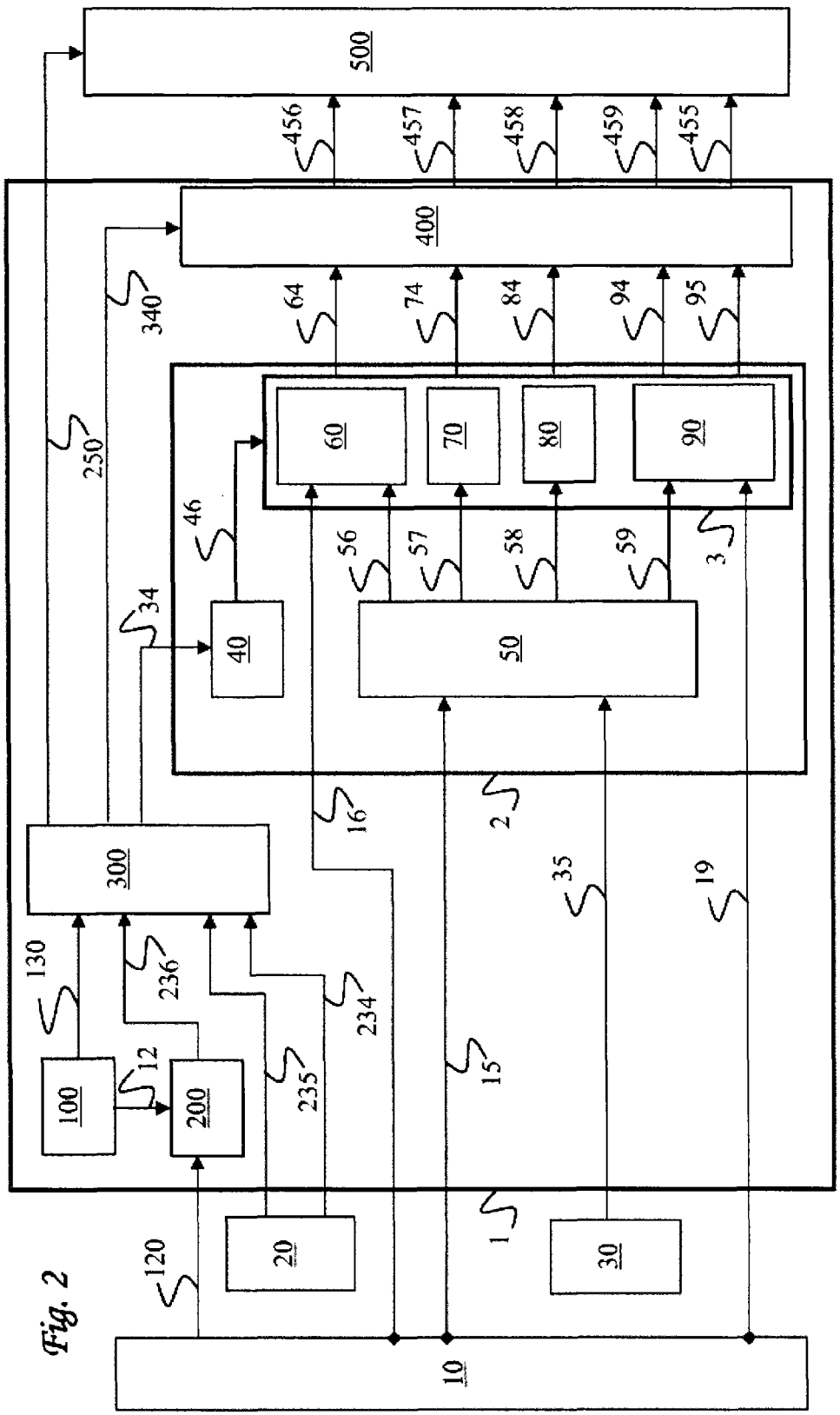

Other features and advantages will become apparent from reading the following description, with reference to the attached drawings in which:
FIG. 1 is a diagram of a system according to the invention,
FIG. 2 shows a control module according to the invention,
FIGS. 3 and 4 each show a finite state machine within the control module depicted in FIG. 2.

FIG. 1 illustrates a control system for a vehicle 11 according to the invention.

It shows a collection of human-control members comprising a steering wheel 6, a gear shift lever 7 having at least three positions, reverse, neutral, drive, a throttle pedal 9, a brake pedal 5 and a parking brake button 8. Each of the human-control members depicted here purely by way of nonlimiting illustration generates one or more manual-driving signals for manually driving at least one of several actuators 25 to 29 of the vehicle 11.

The steering wheel 6 is equipped in the known way with a rotation sensor (not depicted) to generate a manual-driving signal 556 intended for a power steering servo 26 which steers the wheels according to a steering torque reference given by the manual-driving signal 556 in digital or analog form.

The throttle pedal 9 is equipped in the known way with a travel sensor (not depicted) to generate a manual-driving signal 559 of the continuous type, in either digital or analog form, intended for a power plant 29. In an example of a combustion engine power plant, the manual-driving signal 559 is more particularly intended for the electronic injection device. In an example of an electric power plant, the manual-driving signal 559 is more specifically intended for the electronic control device supplying electrical power.

The gear shift lever 7 is equipped in the known way with a position sensor (not depicted) to generate a manual-driving signal 557 intended for a mechanical coupling device 27. In the example of a combustion engine power plant, the mechanical coupling device 27 is, purely by way of illustration, an automatic or at least semiautomatic gearbox. In the example of an electric power plant, the mechanical coupling device 27 is, purely by way of illustration, a simple set of reduction gearing which then does not receive the signal 557. The manual-driving signal 557 is sent to an EVC (electrical vehicle control) computer which manages the electric motor in a suitable way known per se. The manual-driving signal 557 typically has discrete values R, N, D, each one corresponding to one of the at least three positions reverse, neutral, drive.

The brake pedal 5 is in the known way provided with a travel sensor (not depicted) to generate a manual-driving signal 555 of continuous type in digital or analog form intended to communicate a brake-application pressure value to a hydraulic braking device 25.

The parking brake button 8 generates a manual-driving signal 558 of a discrete, typically binary, type, intended to communicate a brake-application command to a parking brake device 28.

An automatic-control module 1 generates autonomous-driving signals 455, 456, 457, 458, 459, respectively of the same kind as the manual-driving signals 555, 556, 557, 558, 559, for driving the actuators 25, 26, 27, 28, 29 of the vehicle.

A switching module 500 comprises respective switches 505, 506, 507, 508, 509 for switching the respective manual-driving signals 555, 556, 557, 558, 559 to respective dual-mode driving signals 655, 656, 657, 658, 659 in manual operation and for switching the respective autonomous-driving signals 455, 456, 457, 458, 459 to the respective dual-mode driving signals 655, 656, 657, 658, 659 in autonomous operation. Each of the dual-mode driving signals 655, 656, 657, 658, 659 is connected to the corresponding actuator 25, 26, 27, 28, 29. In preference to manual switches which already allow the module 500 to be set up for manually selecting the manual-driving signals in a manual mode of operation and the autonomous-driving signals in an autonomous mode of operation, controlled switches such as relays or transistors allow controlled switchover from the manual mode of operation to the autonomous mode of operation and vice versa. When the signals 455 to 459 are transmitted to the switching module 500 by the dedicated CAN bus, the switches 505 to 509 are achieved using a computer addressing mechanism, a first set of memory cells being assigned to the signals 555 to 559, a second set of memory cells being assigned to the signals 455 to 459 and a third set of memory cells being assigned to the signals 655 to 659.

The switching module 500 is advantageously an electronic device of the processor or electronic board type which, through electronic and wired controls, programmed or wired to perform switchings between the commands that may come from the driver and the commands coming from a processor housing the automatic-control module 1 and vice versa. These commands are intended for the actuators of the car notably including those relating to the steering column 26, to the brake 25, to the acceleration 29, to the assisted parking brake 28, to the gear shift lever 7 which in this case has a servo, and to various accessories that have not been depicted.

Thus, the switching module 500 has the effect of forcing the actuators of the car to adopt a certain behavior when the commands from the processor housing the module 1 are active.

The exchanges of signals between the various modules are depicted in wired form in FIGS. 1 and 2. However, it is advantageous to have a communications bus, for example of CAN or some other type, specifically devoted to communications between various processors or electronic devices which house the automatic-control module 1, the switching module 500 and other modules used in autonomous operation of the motor vehicle such as, for example, a navigation/location module 30.

The dedicated communications bus thus does not interfere with the usual vehicle communications bus 10 which therefore need not be modified in order to transfer the invention onto a standard vehicle. The vehicle communications bus 10 incidentally allows the automatic-control module 1, housed in a processor or any other electronic device, to have read-only access to various vehicle data items circulating in the usual way on the bus 10, notably the actual speed of the vehicle, the actual steering angle of the wheels.

The automatic-control module 1 is described in greater detail now with reference to FIG. 2.

An automatic-formulation unit 2 for automatically formulating calculated autonomous-driving signals 64, 74, 84, 94, 95, comprises at least one component 60, 70, 80, 90 for calculating an autonomous-driving signal.

The component 60 is designed to calculate the signal 64 that allows the actuator 26 to steer the steered wheels as a function of an angle setpoint, for example of a setpoint regarding the angle of rotation of the steering wheel 6. In order to calculate the signal 64, the component 60 receives an angle setpoint signal 56 from a course command/control sub-unit 50 and a steering wheel measured angle signal 16 from an angle sensor that exists on the steering column 6, 26 and is sent on the CAN bus 10, or from an angle sensor added to the steering column 6, 26. The component 60 then calculates, in a way known in the field of regulation, a steering torque which, applies to the actuator 26, cancels an error in angle between the values of the signals 16 and 56. The steering torque calculated in real time is then the torque that will allow the wheels to achieve and maintain a desired steering angle. The value of the calculated torque is reported in real time in the driving signal 64. When the steering column 6, 26 comprises feedback control turning it to a setpoint angle, the component reports an angle value in real time in the driving signal 64 and this value in this case is calculated from the signal 56 without the need to read the signal 16 from the bus 10.

The component 70 is designed to calculate the signal 74 that allows the actuator 27 to position itself in such a way that power from the power plant 29 is or is not transmitted to the wheels so as to cause the vehicle to travel in reverse, forward, or to freewheel. The signal 74 is, for example, a ternary signal each of the three values R, N, D of which is calculated in a logical order from a signal 57 originating from the course command/control subunit 50.

The component 80 is designed to calculate the signal 84 that allows the actuator 28 to apply and release the handbrake. The signal 84 is, for example, a binary signal calculated logically from a signal 58 originating from the course command/control subunit 50.

The component 90 is designed to calculate a signal 94 that allows the actuator 29 to accelerate and decelerate the vehicle and a signal 95 that allows the actuator 25 to brake the vehicle. The component 90 receives a signal 59 which provides in real time a speed setpoint value v* originating from the course command/control subunit 50. The component 90 also reads from the vehicle on the CAN bus 10 an actual speed value measured in real time and available in a signal 19 on the vehicle CAN bus. The component 90 in real time calculates an acceleration and braking torque to achieve the speed setpoint v*. The component 90 also calculates in real time a signal 95 for the hydraulic braking of the wheels, for example as soon as the speed of the vehicle is zero in order to keep the vehicle safe despite the possibility of a gradient.

The subunit 50 receives a signal 35 originating from the navigation/location module 30. The signal 35 contains a course setpoint, for example in vector form with three components comprising two spatial coordinates x*, y* and a speed v*. The spatial coordinate setpoints x*, y* and speed setpoint v* are expressed in a frame of reference connected with the vehicle. The subunit 50 in real time calculates the angle of the wheels and the speed required in order to follow the course setpoint received from the module 30. The subunit 50 also has read-only access to the bus 10 in order to receive, in a message or signal frame 15, vehicle data that are necessary or of use in calculating the signals 56 to 59. Purely by way of nonlimiting illustration, mention may be made of data relating to the diameter of the wheels, to the detection of an obstacle, to the gradient of the road surface, to the gear ratio in the particular case of a combustion engine or to the excitation flux in the case of an electric motor.

The navigation/location module 30 is an electronic device external to the module 1, preferably a processor which contains a program for calculating the vehicle course setpoint and which communicates with the module 1 using the dedicated CAN bus. In order to calculate the vehicle course setpoint, the navigation/location module 30 has available to it in a way known from elsewhere, a map of the surroundings of the vehicle, a eudiometric mechanism for the real-time modeling of the change in position of the vehicle, sensors and/or one or more cameras.

The components 60, 70, 80, 90 are grouped together into a subunit 3 that calculates the values of autonomous-driving signals of the vehicle. The subunit 3 is supervised by a command/control subunit 40 by means of one or more calculation sequencing signals 46.

The command/control subunit 40 houses a local finite state machine which will now be explained with reference to FIG. 3.

An initial step 341 is activated by applying power to the module 1.

A transition 342 is validated by a combination of two conditions. A first condition is associated with a signal 34 originating from a supervision unit 300 when its value indicates an instruction to perform an autonomous start, notably after a prolonged stop. A second condition is associated with a non-zero value of the speed setpoint v* originating from the navigation/location module 30.

A validation of the transition 342 activates a succession of three steps 343 to 345.

Step 343 essentially consists in ordering the subunit 3 that calculates values of signals for the autonomous driving of the vehicle to apply the hydraulic brake.

Step 344 essentially consists in ordering the subunit 3 that calculates values of signals for the autonomous driving of the vehicle to release the handbrake.

Step 345 essentially consists in ordering the subunit 3 that calculates values of signals for the autonomous driving of the vehicle to make the actuator 27 move from the neutral position N into the drive position D.

The local finite state machine then returns to the initial step 341, leaving the subunit 3 that calculates values of autonomous-driving signals free to accelerate the vehicle and cause it to follow the course setpoint. This sequence of operations guarantees that the vehicle is always in a safe situation and cannot move unauthorized, for example as a result of the gradient.

A transition 346 is validated by a combination of two other conditions. A first other condition is associated with the signal 34 originating from the supervision unit 300 when its value indicates an instruction for the autonomous immobilization or making-safe of the vehicle, notably with a view to a prolonged stop. A second other condition is associated with a zero value of the speed setpoint v* originating from the navigation/location module 30 and with the stopped state of the vehicle (measured speed zero).

A validation of the transition 346 activates a series of three steps 347 to 349.

Step 347 essentially consists in ordering the subunit 3 that calculates values of signals for the autonomous driving of the vehicle to make the actuator 27 move from the drive position D into the neutral position N.

Step 348 essentially consists in ordering the subunit 3 that calculates values of signals for the autonomous driving of the vehicle to apply the handbrake.

Step 349 essentially consists in ordering the subunit 3 that calculates values of signals for the autonomous driving of the vehicle to release the hydraulic brake.

The local finite state machine then returns to the initial step 341, awaiting a further instruction to start.

This sequence of events again guarantees that the vehicle is always in a safe situation and cannot move unauthorized, for example as a result of the gradient.

The unit 2 sends the calculated autonomous-driving signals 64, 74, 84, 94, 95 to a safety unit 400 that is described now.

The safety unit 400 is supervised by the supervision unit by means of one or more autonomous-driving selection signals 340 that are to be transmitted to the switching module 500.

When a value of a selection signal 340 indicates an automatic emergency stop, this generally being associated with a case of abnormal autonomous operation, the safety unit 400 transmits to the switching module 500 one or more autonomous-driving signals 455 to 459 each of which passes on an emergency autonomous-driving signal.

The autonomous-driving signal 456 passes on the signal 64 as delivered by the component 60 so as to keep the value of the steering angle as it is as a result of the steering.

The autonomous-driving signal 457 passes on a force status which forces the actuator 27 into the neutral position N so as not to transmit power from the power plant 29 to the wheels.

The autonomous-driving signal 458 passes on a force status contained for example in a memory which forces the actuator 28 to apply the handbrake.

The autonomous-driving signals 459, 455 pass on a force status which forces values contained for example in a memory which reproduce a zero value for the acceleration of the vehicle and force the actuator 25 to brake the vehicle.

When the value of the selection signal 340 does not indicate an automatic emergency stop which is indicative of a case of abnormal autonomous operation but indicates a command to run, which is indicative of a case of normal autonomous operation, the safety unit 400 passes on to the switching module 500 the autonomous-driving signals 456, 457, 458, 459, 455 which respectively pass on the autonomous-driving signals 64, 74, 84, 94, 95 originating from the unit 2.

Thus, the safety unit 400 is designed to transmit to the switching module 500 the calculated autonomous-driving signals in the case of normal autonomous operation and the emergency autonomous-driving signals in the case of abnormal autonomous operation.

It will be noted that the safety unit 400 is the guardian of the outputs from the module 1. All the outputs pass via the safety unit 400 before being sent, for example using the dedicated CAN bus, to the switching module 500.

A second function which relates to complete separation between the manual mode of operation relating to manual driving and the autonomous mode of operation relating to automatic driving may be added to the above-mentioned first function of the safety unit 400.

When the value of the selection signal 340 indicates neither an automatic emergency stop nor a command to run in autonomous mode, the signals 459, 455, 456, 458, 457 relating respectively to the outputs for the acceleration, braking, steering, brake and RND actuators are positioned on non-defined values, in other words on values that the actuators cannot interpret, for example a value outside the range of operation of the actuator. Thus, the switching module 500 cannot mistakenly command automatic operation outside of the cases provided for. In other words, even if the switching module erroneously reproduces one of the signals 455 to 459 on one of the signals 655 to 659 when the module 1 is not in the autonomous mode of operation, the value of the signal, which is thus incompatible with the operation of the respective actuator, is detected as being invalid or preferably to trigger an extreme emergency stop, to the extent of causing the vehicle to brake abruptly.

Figure 4:
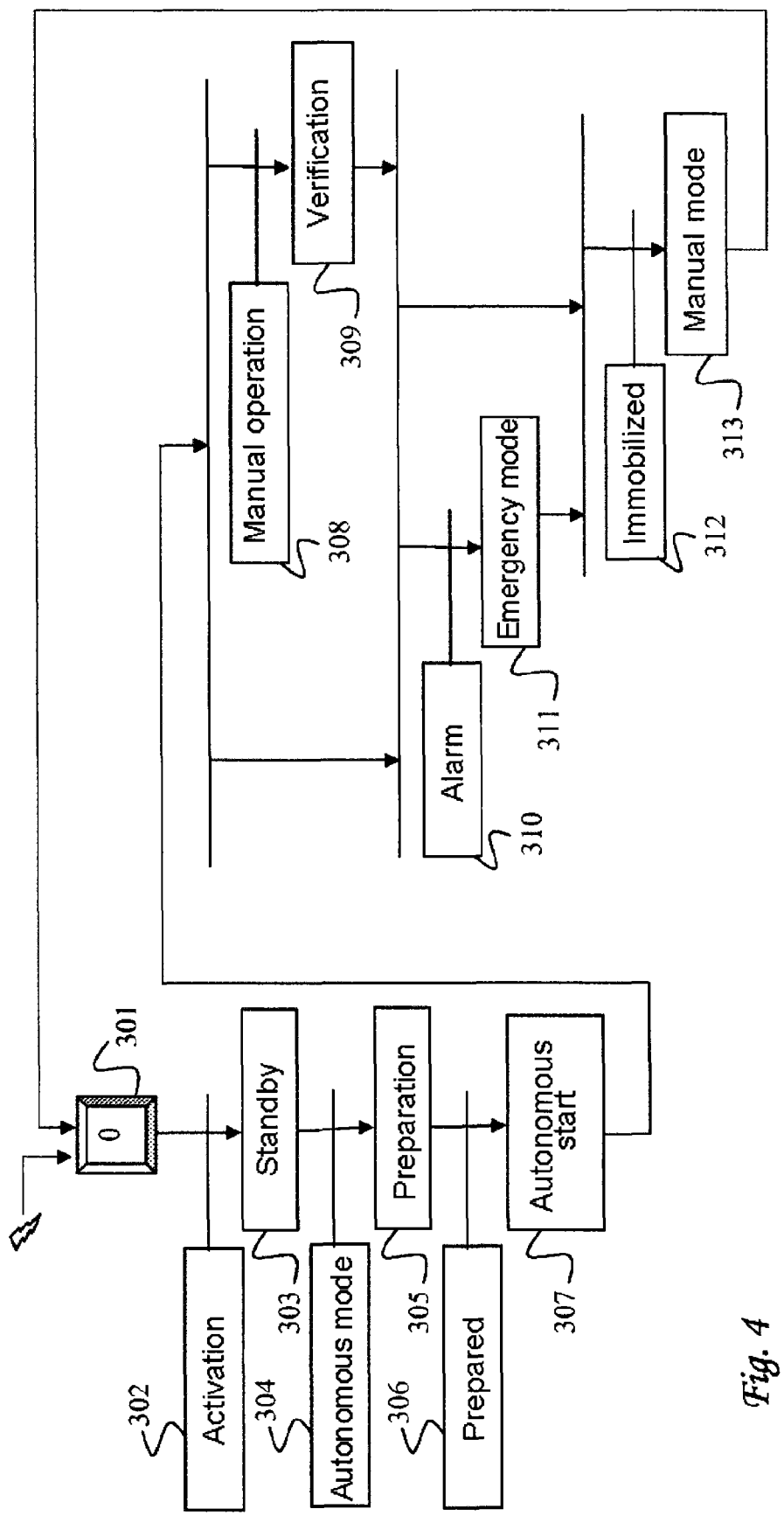

In the implementation mode of the invention that is illustrated by FIG. 2, the switching module 500 is controlled by a selection signal 250 originating from the automatic-control module 1, more particularly from a supervision unit 300 that houses an overall finite state machine explained now with reference to FIG. 4.

The application of power to the automatic-control module 1 positions the overall machine in an initial step 301. In the initial step 301, the automatic-control module 1 is in a sleeping state.

An activation transition 302 is validated when a signal 130 originating from a diagnostics unit 100 indicates that the control devices and means permanently monitored by the diagnostics unit 100 have a clean bill of health and when the master module 20 demands this transition.

The devices monitored essentially comprise the CAN bus 10 that communicates with the remainder of the vehicle, the connection or connections with the switching module 500, the actuators that make the vehicle move (brake, acceleration, steering system, assisted parking brake).

The control means monitored essentially comprise those relating to the steering angle (demanded steering angle with respect to the measured steering angle), those relating to the speed (desired speed with respect to the measured speed) and those relating to the course (desired course with respect to the actual course).

If the diagnostics unit 100 detects a malfunction in one of the control means or devices mentioned, the overall machine triggers an exception state of the automatic-control module 1, which is carried out for example using a step 311 explained further on in the description.

A validation of the transition 302 activates a step 303 of placing the automatic-control module 1 on standby. The steps 301 and 303 correspond to a state of the overall machine, which state is associated in theory with the manual mode of operation.

A transition 304 from autonomous mode is validated when a signal 236 originating from an automatic-control activation authorization unit 200 indicates that the control module 1 is in established communication, for example via a signal 120, with each of the other modules 20, 30 necessary for the autonomous mode of operation, but the vehicle is stopped, with the hand brake applied and, if possible, with the gear shift lever in neutral position and when the master module 20 demands this transition.

The conditions whereby the vehicle speed is zero, the assisted parking brake is applied, the transmission is in neutral and the engine is in a state ready to start as verified by the automatic-control activation authorization unit 200, are necessary in order to be able to activate autonomous control of the vehicle. If at least one of these conditions is not met, autonomous control of the vehicle cannot be activated.

Furthermore, the unit 300 receives information originating from the automatic-control activation authorization unit 200 which, depending on the state of the vehicle as obtained via the signal 120 and the diagnostics as obtained via a signal 12 originating from the unit 100, can prevent activation of autonomous control.

A validation of the transition 304 activates a step 305 of preparing the control module 1 to begin autonomous control of the vehicle. The step 305 of preparing the control module 1 essentially consists in sending the signal 250 to the switching module 500 so as to select the manual-driving signals 455 to 459 in order to switch them over to the signals for driving the actuators 655 to 659, in sending the signal 340 to the safety unit 400 so as to reproduce the calculated autonomous-driving signals 64, 74, 84, 94, 95 on the autonomous-driving signals 456, 457, 458, 459, 455 and, in placing the gear shift lever in neutral N, if it is not there already.

A transition 306 is validated when the control module 1 is prepared and, in the embodiment of the invention illustrated by FIG. 2, when in addition a master module 20 sends the supervision module 300 a signal 235 to begin operating (working) the control module 1 in order to take autonomous control of the vehicle. The master module is, for example, a processor which manages the phases of life of those of the processors that allow the dual mode operation of the vehicle 11.

A validation of the transition 306 activates a step 307 of autonomous starting which essentially consists in sending the signal 34 to the command/control subunit 40 so as, in other words with a value able, to validate the transition 342 of the local finite state machine.

A transition 308 is validated when the master module 20 sends the supervision unit 300 the signal 235 set to a non-operating (out of working) value for the control module 1 so as to stop autonomous control of the vehicle or, in other words, to switch back to manual mode.

A validation of the transition 308 activates a pre-switching verification step 309 and a conditioning step for switching to manual mode. The step 309 essentially consists in verifying that the speed of the vehicle is zero, if possible with the hydraulic brake applied, and in sending the signal 34 to the command/control subunit 40 so as, or in other words with a value able, to validate the transition 346 of the local finite state machine.

The steps 307 and 309 correspond to a state of the overall machine, which is associated with the autonomous mode of operation or more specifically with the normal autonomous mode of operation.

An alarm transition 310 is validated when the master module 20 sends the supervision unit 300 a signal 234 requesting an emergency stop and/or when the diagnostics unit 100 sends the supervision unit 300 diagnostics information that can trigger an exception downgraded state.

A validation of the transition 310 from the step 307 or from the step 309 activates a step 311 which essentially consists either, if no internal error is detected, in generating the signal 340 with a value that commands the unit 400 to transmit to the switching module 500 an emergency autonomous-driving signal or, if an internal error is detected, in allowing the master module 20 to demand an emergency autonomous-driving signal of the module 500. This approach covers the situation whereby an error that has appeared prevents the subunit 50 from performing its functions. The emergency mode step 311 corresponds to an overall machine state associated with the autonomous mode of operation, more specifically with an abnormal autonomous mode of operation.

Thus, a command for an emergency stop originating from the master 20 outside the module 1 is performed without delay, short-circuiting the internal calculation units of the control module. The diagnostics unit 100, internal to the module 1, constantly monitors the state of health thereof so as to be able to flag up malfunctionings to the master module 20 on the outside and place the module 1 in an exception state.

A transition 312 is validated following step 309 or step 311 when the vehicle is immobilized, in other words when the speed of the vehicle is detected to be zero.

A validation of the transition 312 activates a step 313 of switching to manual mode. In step 313, the supervision unit 300 sets the value of the signal 340 in such a way as to command the subunit 3 to place values outside the definition range in the driving signals 64, 74, 84, 94, 95. Thus, the outputs from the module 1 are assigned to fixed or variable values in such a way that guarantees manual mode and autonomous mode non-interference.

Furthermore, the supervision unit 300 sets the value of the signal 250 in such a way as to command the switching module 500 to switch the signals 555 to 559 onto the signals 505 to 509. It will be noted that in the absence of a signal 250, for example in the situation in which the module 1 has no power applied, the signals 555 to 559 are switched over by default onto the signals 505 to 509.

The step 313 corresponds to a state of the overall machine that is associated with the manual mode of operation.

Thus, the overall finite state machine receives commands from the master module 20 to sequence the operation of the control module 1 and to switch over the driving signals in the module 500 to switch from manual mode of driving to an automated or autonomous mode of driving, and vice versa.

In that way, operation of the automatic-control module 1 is sequenced by the master module 20 external to the control module and by the supervision unit 300 internal to the control module.

It is clear from the description given hereinabove that operation of the automatic-control module 1 is sequenced in such a way as to provide at least three safety means.

The first safety means is that of allowing an automatic control of the vehicle to start provided that all the suppliers of data necessary for the autonomous mode are prepared. Automatic control of the vehicle 11 is used notably in autonomous mode in order to operate the vehicle on the basis of data originating from digital processing units such as the master module 20, the communications bus 10 which is, for example of the CAN (controller area network) type, or the navigation/location module 30 without human intervention.

The second safety means involves allowing switches from manual mode to autonomous mode and vice versa only when the vehicle is safe, or in other words stopped in a stable and deterministic state.

Figure 3:
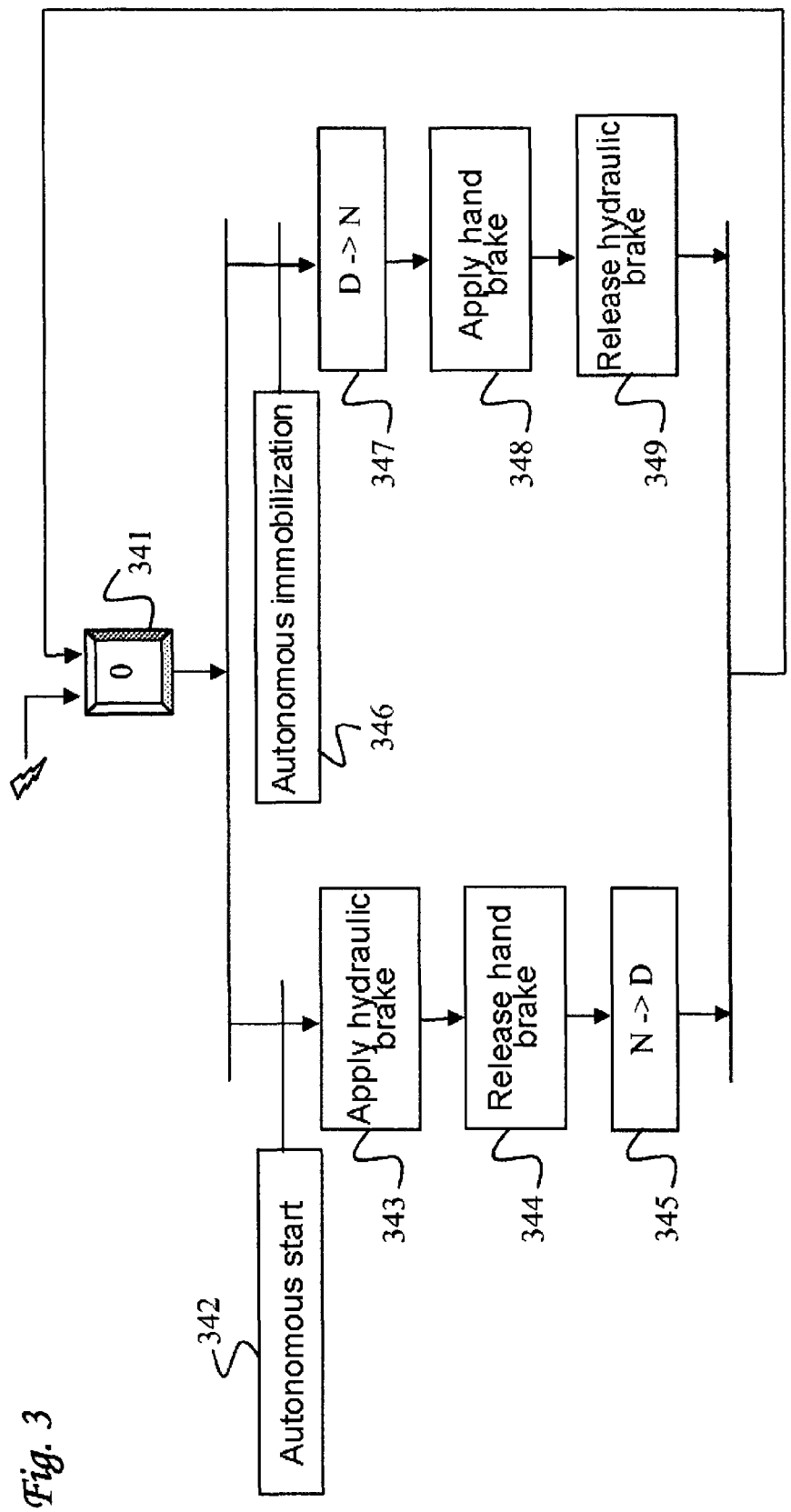

The third safety means consists in starting and stopping the vehicle safely using the sequence of events set out in FIG. 3.

It will be noted that steps 301 to 313 and/or 341 to 349 can be considered as control method steps implemented using a computer program installed in the system described above or in another system with a different physical architecture with the sole proviso that it is compatible with the system according to the invention.

The automatic-control module that we have just described for a dual-mode vehicle is able to receive desired courses and formulate the controls for the actuators of the vehicle so that these courses can be followed in autonomous driving. The automatic-control module is able to meet reliability and cost considerations, notably by ensuring coordination with the other modules external to it, providing switching of the actuators between manual mode and autonomous mode under automatic control, ensuring coordination of operations internal to the module and ensuring at the overall vehicle level, that operation in a nominal or normal autonomous mode and operation in an emergency autonomous mode is safe.

The invention claimed is:

1. A vehicle control system comprising:
    manual-control members that generate manual-driving signals to manually drive actuators of the vehicle;
    automatic-control circuitry that generates autonomous-driving signals to autonomously drive the actuators of the vehicle; and
    switching circuitry configured to select the manual-driving signals in a manual mode of operation and to select the autonomous-driving signals in an autonomous mode of operation,
    wherein the automatic-control circuitry includes:
        an automatic-formulation circuitry portion that automatically formulates at least one calculated autonomous-driving signal,
        a safety circuitry portion configured to transmit to the switching circuitry the at least one calculated autonomous-driving signal in a case of normal autonomous operation and an emergency autonomous-driving signal in a case of abnormal autonomous operation,
        a supervision module having an overall finite state machine with a first overall state associated with the manual mode of operation and a second overall state associated with the autonomous mode of operation to send the switching circuitry at least one signal to select the manual-driving signals and the autonomous-driving signals, wherein the overall finite state machine comprises a third overall state associated with the case of abnormal autonomous operation to send the safety circuitry portion at least one emergency braking signal.

2. The control system as claimed in claim 1, wherein the automatic-control circuitry includes a diagnostics circuitry portion configured to detect any event associated with a case of abnormal autonomous operation and to send the supervision module at least one signal indicative of the cases of normal and abnormal autonomous operation.

3. The control system as claimed in claim 1, wherein the automatic-formulation circuitry portion has a command/control subunit with a local finite state machine comprising a first local state associated with an autonomous start and a second local state associated with an autonomous immobilization.

4. The control system as claimed in claim 1, further comprising navigation and/or location circuitry configured to send the automatic-formulation circuitry portion, in real time, course coordinates that are expressed in a frame of reference local to the vehicle.

5. A method for controlling a vehicle comprising:
executing one or more manual-modes in which manual-control members generate manual-driving signals for manually driving actuators of the vehicle; and
executing, using automatic-control circuitry, one or more autonomous-modes in which autonomous-driving signals are generated and switched toward the actuators of the vehicle in place of the manual-driving signals;
wherein said executing the one or more autonomous-modes using the automatic-control circuitry includes:
executing a normal autonomous-mode performed in a case of normal autonomous operation and in which the autonomous-driving signals comprise at least one calculated autonomous-driving signal, and
executing an emergency autonomous-mode performed in a case of abnormal autonomous operation and in which the autonomous-driving signals comprise at least one emergency autonomous-driving signal,
wherein the automatic-control circuitry includes a supervision module having an overall finite state machine with a first overall state associated with the manual mode of operation and a second overall state associated with the autonomous mode of operation to send at least one signal to select the manual-driving signals and the autonomous-driving signals, and
wherein the overall finite state machine comprises a third overall state associated with the case of abnormal autonomous operation to send at least one emergency braking signal.

6. The control method as claimed in claim 5, further comprising:
at least one first performing an autonomous start; and
at least one second performing an autonomous immobilization.

7. A non-transitory computer readable medium comprising a computer program product comprising instructions for implementing the method as claimed in claim 5 when performed by a computer.

8. A motor vehicle, comprising the vehicle control system as claimed in claim 1.

* * * * *